United States Patent [19]
Wright et al.

[11] Patent Number: 5,940,978
[45] Date of Patent: Aug. 24, 1999

[54] BUILDER'S LEVEL WITH HAND-GRIP FEATURE

[75] Inventors: Randall J. Wright, Hartland; Joseph B. Coel, Waterford, both of Wis.

[73] Assignee: Empire Level Mfg. Corp., Milwaukee, Wis.

[21] Appl. No.: 08/927,707

[22] Filed: Sep. 10, 1997

Related U.S. Application Data

[63] Continuation-in-part of application No. 08/513,203, Aug. 10, 1995, Pat. No. 5,726,553.

[51] Int. Cl.$^6$ ...................................................... G01C 9/28
[52] U.S. Cl. ................................................. 33/381; 33/350
[58] Field of Search ............................. 33/379, 380, 381, 33/382, 383, 384, 385, 386, 387, 388, 389, 390, 350

[56] References Cited

U.S. PATENT DOCUMENTS

| | | |
|---|---|---|
| 285,775 | 8/1883 | Youngs . |
| 377,870 | 2/1888 | St. John . |
| 453,452 | 6/1891 | Traut . |
| 469,451 | 2/1892 | Praddex . |
| 695,793 | 3/1902 | Chamberlain . |
| 756,628 | 4/1904 | Happle . |
| 783,897 | 2/1905 | Sanger . |
| 970,897 | 9/1910 | Earman ...................................... 33/350 |
| 1,108,134 | 8/1914 | Cassidy . |
| 1,141,617 | 6/1915 | Creamer . |
| 1,473,877 | 11/1923 | Rome ........................................ 33/350 |
| 2,636,282 | 4/1953 | Kronquist ................................. 33/194 |
| 2,702,947 | 3/1955 | Dreier ....................................... 33/214 |
| 3,561,123 | 2/1971 | Bowman et al. .......................... 33/73 |
| 3,826,013 | 7/1974 | Baher ........................................ 33/390 |
| 4,419,833 | 12/1983 | Wright ..................................... 33/379 |
| 4,463,501 | 8/1984 | Wright et al. ............................ 33/350 |
| 4,590,682 | 5/1986 | Koch ......................................... 33/383 |
| 4,860,459 | 8/1989 | Dengler ................................... 33/379 |
| 4,979,310 | 12/1990 | Wright ..................................... 33/379 |
| 5,046,387 | 9/1991 | Levake ..................................... 81/489 |

FOREIGN PATENT DOCUMENTS

| | | |
|---|---|---|
| 1335587 | 7/1963 | France . |
| 667536 | 11/1965 | France . |
| 174335 | 3/1905 | Germany . |
| 3314509 | 10/1984 | Germany . |

*Primary Examiner*—G. Bradley Bennett
*Attorney, Agent, or Firm*—Jansson, Shupe, Bridge & Munger, Ltd.

[57] ABSTRACT

The improved builder's level is used by carpenters, masons and the like for determining parallelism or perpendicularity with respect to a horizontal plane. The level has opposed depressed channels extending along its length, thereby permitting the level to be more securely gripped. The body of the level has interior ridges and an interior web for reinforcement and to properly position liquid-containing vials in such body.

20 Claims, 4 Drawing Sheets

BUILDER'S LEVEL WITH HAND-GRIP FEATURE

RELATED APPLICATION

This application is a continuation-in-part of application Ser. No. 08/513,203 filed on Aug. 10, 1995, and now U.S. Pat. No. 5,726,553.

FIELD OF THE INVENTION

This invention relates generally to geometric instruments and, more particularly, to builder's levels.

BACKGROUND OF THE INVENTION

The hand levels of the prior art are generally elongated, rectangular-shaped tools having peepholes through which vials containing liquid may be viewed. When placed on a surface parallel to a horizontal or vertical plane, the indicators in these vials can be read to determine whether the plane is perfectly horizontal or vertical, as the case may be.

Levels are of particular value on construction sites and tend to be used repeatedly and in different locations throughout an individual site. They therefore need to be easily portable.

However, construction sites are also often exposed to the elements. Wind or rain could cause displacement of a very lightweight tool. A hand level should therefore have sufficient weight so that the level remains where placed both when in and when not in use.

Because portability is desirable in a tool of this type, a level should be easy to grasp and carry. Since levels need to be elongated to properly measure pitch, such a tool can be awkward to carry. Consequently, a level should be constructed in a manner that makes it relatively easy to grasp and carry by hand.

Some of the levels of the prior art incorporate sides that are concave or are otherwise not perpendicular to each other. For example, U.S. Pat. No. 285,775 (Youngs) has a generally concave surface along each of two opposed wider sides, with a flat central portion between two curved edge portions. The level of the Youngs patent has a glass bulb and brass ring protruding from one of the concave sides, making it unsymmetrical along its length. This level also incorporates substantial open areas along its length.

U.S. Pat. No. 377,870 describes a level having concave sides. However, the concavity of the Youngs' and St. John's designs are not intended to, nor do they, facilitate grasping the device in either case.

These and other known devices of the prior art have certain disadvantages. For example, these prior inventions are not as easy to grasp and carry as the present invention. Furthermore, these prior inventions do not adequately protect the viewing portion of the levels from possible marring or scratching.

Another disadvantage of the prior art is a lack of symmetry, making the devices of the prior art less stable when placed on a surface for use or storage. Such a lack of symmetry makes such devices more likely to fall over unexpectedly, resulting in inefficiency, possible incorrect readings, or damage to the device.

OBJECTS OF THE INVENTION

It is an object of the invention to provide an improved builder's level which overcomes some of the problems and shortcomings of the prior art.

Another object of the invention is to provide an improved builder's level that is easier to grasp and carry.

Another object of the invention is to provide an improved builder's level that is configured in such a manner that the vials are protected from scratching.

Still another object of the invention is to provide an improved builder's level that is easy and inexpensive to manufacture.

Yet another object of the invention is to provide an improved builder's level that is stable when used or stored.

How these and other objects are accomplished will become more apparent from the following descriptions and from the drawings.

SUMMARY OF THE INVENTION

The invention involves a geometric instrument having a pair of opposing wide sides. In the improvement, at least one of the wide sides includes a pair of intersecting flat surfaces forming a gripping channel whereby the instrument may be more securely held.

In a preferred embodiment, the wide sides are bounded by a pair of opposing edge portions which each have a first dimension. Each wide side includes a groove portion, each of which are spaced apart by a second dimension which is less than the first dimension.

In yet another aspect of the invention, at least one of the flat surfaces is bounded by a channel portion which is rib-protected to help prevent scratching of the channel portion. These ribs also protect the wide sides from marring when the instrument is placed on its side. This feature, along with the depressed gripping channel, make it less likely that the surface of the vials will be scratched, thereby making the instrument easier to use and read for a longer period of time than comparable level instruments. In this embodiment of the invention, the instrument may be symmetrical about a plane substantially perpendicular to the edge portions and midway between the wide sides.

In a preferred embodiment of the invention, the instrument includes a pair of groove portions. A web-like reinforcing member extends between these groove portions, whereby the instrument resists deformation. In this embodiment, the instrument may include a vial assembly contacting the reinforcing member and may also have its wide sides bounded by a pair of opposing edge portions where at least one of the edge portions includes a ridge extending therealong.

In another embodiment of the instrument, the instrument includes first, second and third vials and the wide sides are bounded by a pair of opposing edge portions, the first and third vials are generally normal to the edge portions and the second vial is generally coincident with one of the edge portions.

In this embodiment, the wide sides of the instrument may also include two pairs of aligned openings and the first and third vials are received in a respective pair of aligned openings, whereby the first and third vials are visible from either wide side. The instrument may also include a first end and an aperture adjacent to the first end for receiving a hanger therethrough.

Another embodiment of the invention includes edge portions and a pair of spaced opposing wide sides extending between the edge portions, wherein each wide side includes a depressed gripping channel extending therealong. This instrument may be extending along a long axis wherein the edge portions and the wide sides define a hollow instrument body, including a lateral body-reinforcing member and at least two longitudinal ridges which resist bending along the axis. In this embodiment, each gripping channel may have an interior apex, the body-reinforcing member may be between the apexes and the instrument may include a plurality of ridges extending along each of the edge portions generally parallel to the channels.

In yet another aspect, the invention is a builder's level comprising an elongated body having a pair of edge portions which are parallel to one another, at least one level vial mounted in the body, at least one plumb vial mounted in the body, a web inside the body for positioning and retaining the level vial in a predetermined angular relationship with respect to such edge portions and at least one depressed gripping channel extending along the body. This level may include a pair of depressed gripping channels extending along the body. If so, at least one of the gripping channels is preferably defined by a pair of intersecting flat surfaces and the included angle between the flat surfaces is in the range of 130° to 170°.

Other aspects of the invention are set forth in the following detailed description and in the drawings.

DETAILED DESCRIPTION OF PREFERRED EMBODIMENTS

Figure 1:
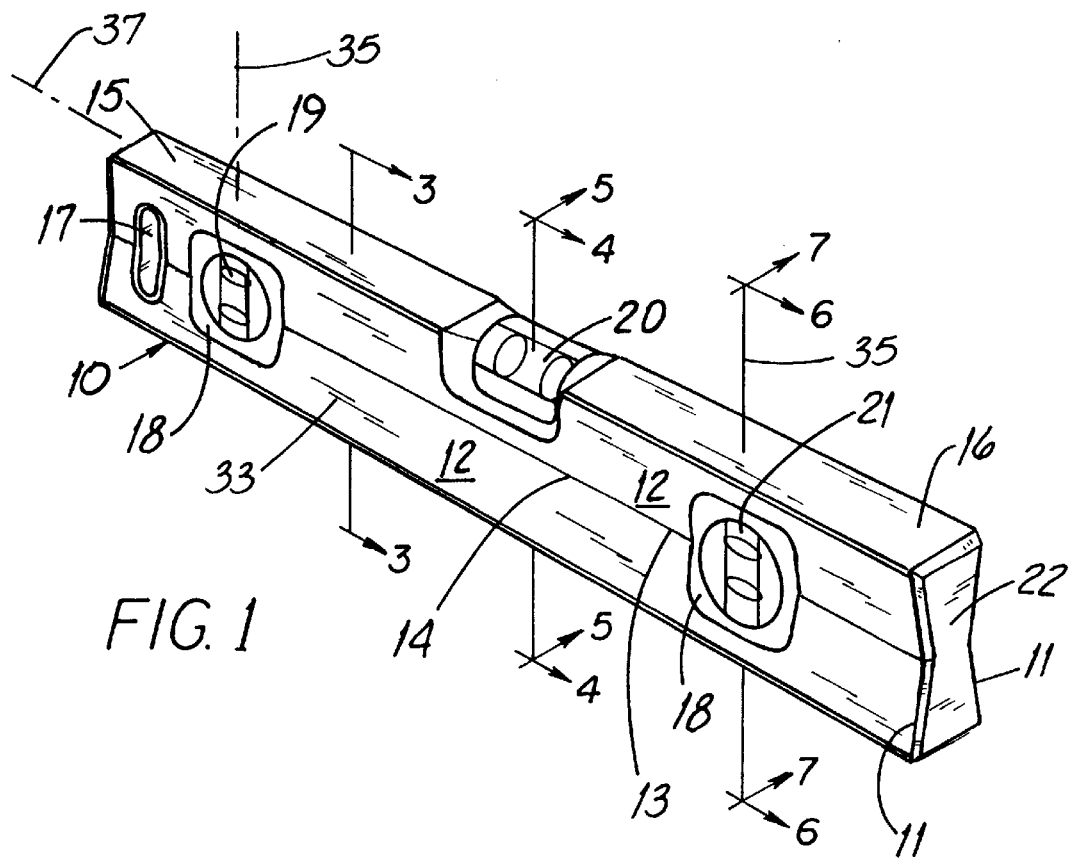
FIG. 1 is a perspective view of the inventive instrument.

Referring first to FIG. 1, the new instrument 10 is elongated with a generally rectangular overall shape. Although the size can vary, the instrument 10 is ideally 24 inches in length, 2¼ inches in width and 1 inch deep. These dimensions allow the instrument 10 to be large enough to give accurate readings, but small enough to be easily transportable.

The instrument 10 has first and second opposing wide sides 11, each wide side 11 being comprised of a pair of intersecting flat surfaces 12. These intersecting flat surfaces 12 form a "V" shape and define a gripping channel 13 by which the instrument 10 may be easily grasped. Each gripping channel 13 has an interior apex 14 where the intersecting flat surfaces 12 meet. Ideally, the instrument 10 has a first end 15, a second end 16 and an aperture 17 adjacent to the first end 15.

In the preferred embodiment, the wide sides 11 of the instrument 10 include two pairs of aligned openings 18. The instrument 10 contains a first vial 19 situated in one of the pairs of aligned openings 18 toward the first end 15 of the instrument 10, a second vial 20 located halfway along the length of the instrument 10, and a third vial 21 situated in the second pair of aligned openings 18 of the instrument 10. The long axes 35 of the vials 19, 21 are parallel to one another and perpendicular to the long axis 37 of vial 20. (It is also to be noted that axis 37 is also a long axis of the instrument body 33.)

The first vial 19 and the third vial 21 are plumb vials and the second vial 20 is a level vial. That is, vials 19 and 21 are used to determine whether a wall or the like is vertical, i.e., "plumb," and vial 20 is used to determine whether a surface is horizontal, i.e., level.

The first end 15 and the second end 16 ideally have rubber strips 22 affixed to the exposed end surfaces. Such rubber strips 22 help to protect against possible scratching of other objects by the instrument 10 while in use by covering the exposed surfaces of the first end 15 and the second end 16. The rubber strips 22 also seal off the largely hollow interior of the instrument 10.

Figure 2:
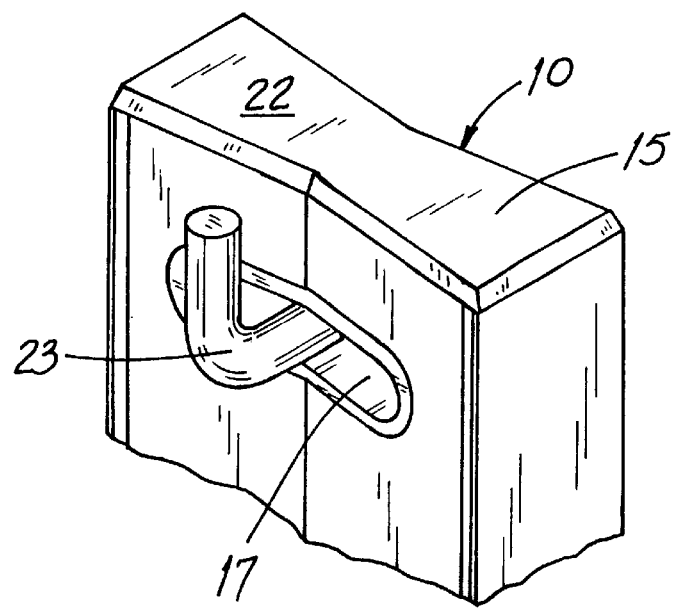
FIG. 2 is a perspective view of the back of the instrument with parts broken away showing the instrument as it would appear on a hanger.

Referring also to FIG. 2, the aperture 17 is useful for storage purposes. The instrument 10 can be placed so that a hanger 23 or other similar device projects through the aperture 17 to hold the instrument 10 in place on a wall or other storage site.

Figure 3:
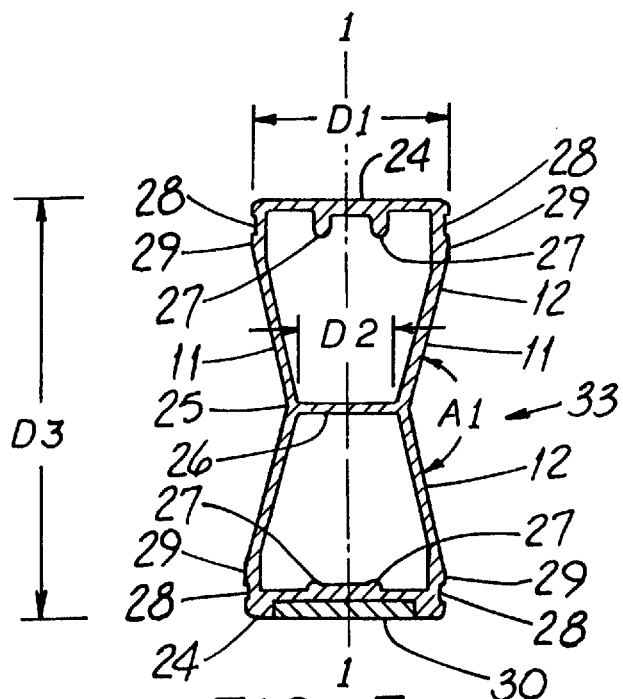
FIG. 3 is a cross section view of the instrument as shown in FIG. 1, taken generally along the viewing plane 3—3.

Referring also to FIG. 3, the instrument 10 is symmetrical about a plane of symmetry 1—1, which is substantially perpendicular to the edge portions 24 and midway between the wide sides 11. The wide sides 11 are bounded by a pair of opposing edge portions 24, having a first dimension D1. The wide sides 11 also each have a groove portion 25, and the groove portions 25 are spaced apart by a second dimension D2 which is less than the first dimension D1. Ideally, the included angle A-1 between the flat surfaces 12 of each wide side 11 is in the range of 130° and 170°.

And the instrument 10 also has other dimensional relationships. The dimension D1 of each edge portion 24 is significantly less than the dimension D3 between such edge portions 24.

Referring further to FIG. 3, the groove portions 25 may be connected by a web-like reinforcing member 26 which is omitted at the openings 18 but which otherwise extends along the length of the interior of the instrument 10. The instrument 10 preferably also includes ridges 27 which extend from the edge portions 24 toward the reinforcing member 26 and are parallel to the member 26.

In the preferred embodiment, each of the flat surfaces 12 is bounded by a channel portion 28 which is protected by ribs 29 to help prevent scratching of the channel portion 28 and the wide sides 11 of the instrument 10. Also shown in FIG. 3, in one embodiment, the instrument 10 may have a magnetized strip 30 along one edge portion 24, to hold the instrument 10 in place when positioned on a metal surface.

Figure 4:
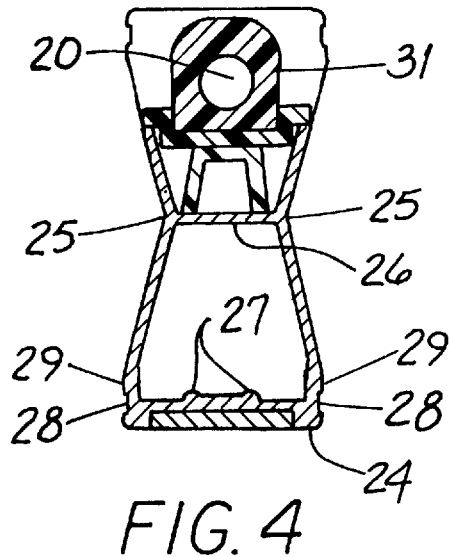
FIG. 4 is a cross section view of the instrument as shown in FIG. 1, taken generally along the viewing plane 4—4.
Figure 5:
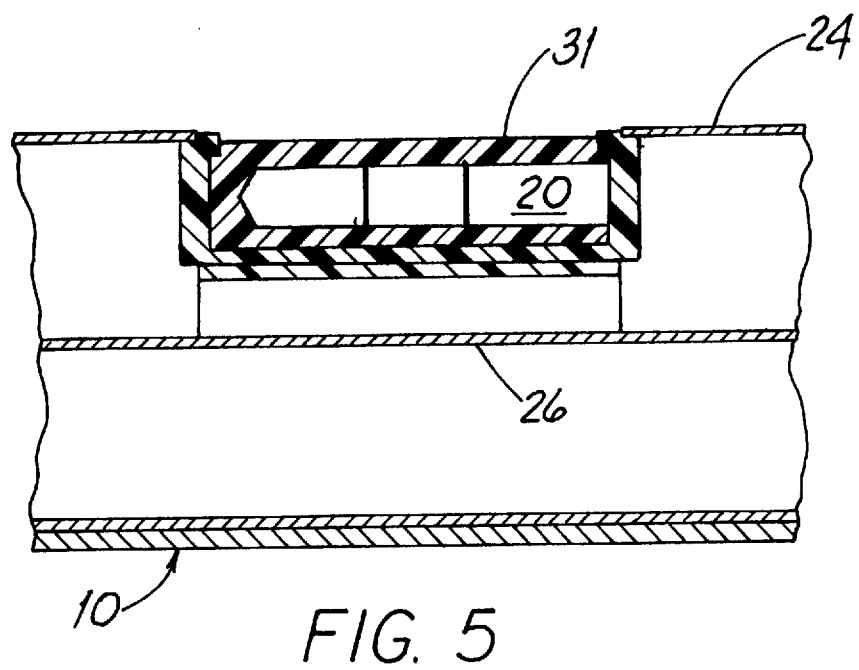
FIG. 5 is a cross section view of the instrument as shown in FIG. 1, taken generally along the viewing plane 5—5, with parts broken away.
Figure 6:
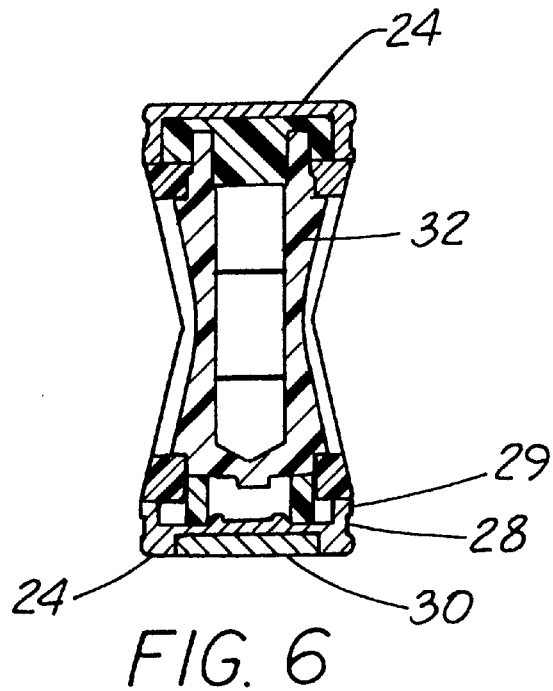
FIG. 6 is a cross section view of the instrument as shown in FIG. 1, taken generally along the viewing plane 6—6.
Figure 7:
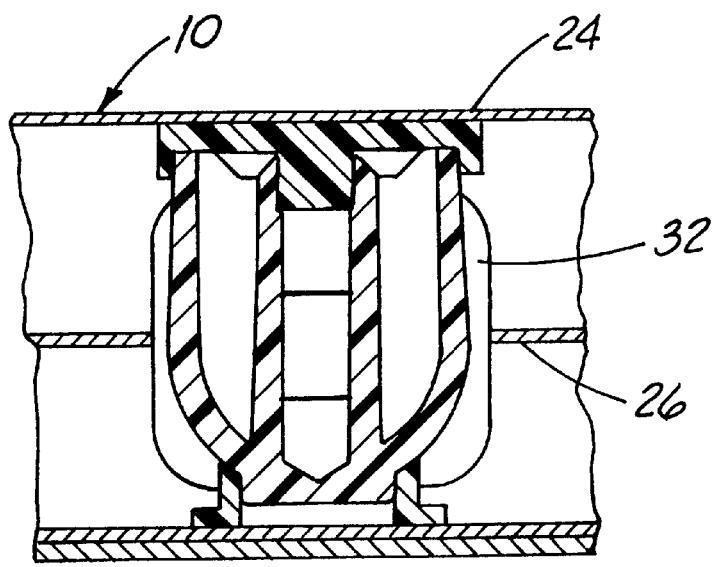
FIG. 7 is a cross section view of the instrument as shown in FIG. 1, taken generally along the viewing plane 7—7, with parts broken away.
Figures 8, 9:
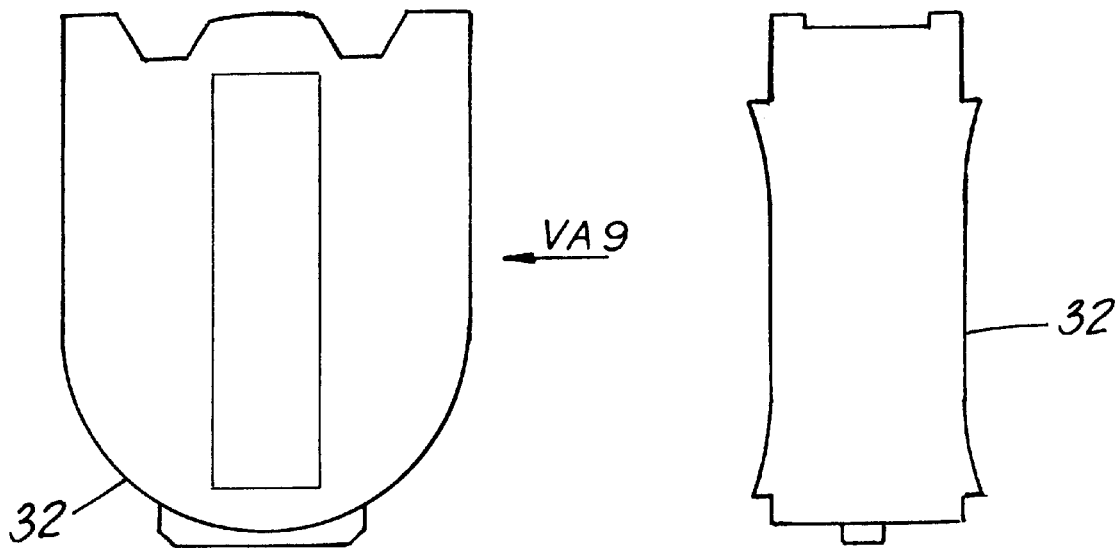
FIG. 8 is a side view of the vial assembly shown in FIG. 7.
FIG. 9 is an edge view of the vial assembly of FIG. 8 taken along the viewing axis VA9 thereof.
Figure 10:
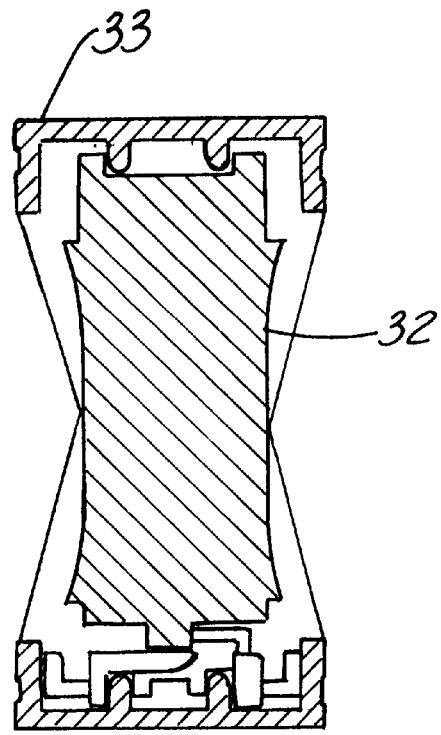
FIG. 10 is an end view generally like that of FIG. 6 and showing the vial assembly of FIG. 8 mounted in the instrument body.

Referring also to FIGS. 4 and 5, the level vial assembly 31 of the second vial 20 is supported in the instrument 10 by the web-like reinforcing member 26. Referring also to FIGS. 6 through 10, the plumb vial assemblies 32 of the first vial 19 and the third vial 21 are positioned in the instrument 10. The ridges 27 help to support the assemblies 32 in their proper position in the instrument 10. That is, since the ridges 27 extend substantially the entire length of the body 33, such ridges 27 help prevent the assemblies 32 from rotating clockwise or counterclockwise (as considered in the view of FIG. 6 or of FIG. 7) and also help prevent the assemblies from shifting laterally, i.e., left or right, in the view of FIG. 6. As shown in FIGS. 1 and 7, the assemblies 32 are inserted into the openings 18 in the instrument 10.

Referring again to FIGS. 1 and 3, the frame or body 33 of the instrument 10 is preferably of one-piece construction. That is, such body 33 is free of any joints or junctions which would otherwise be present if two or more pieces were used to make such body 33. In a specific embodiment, the body 33 is made of extruded aluminum.

While the principles of the invention have been described in connection with exemplary embodiments, it should be understood clearly that such descriptions are by way of example and are not limiting.

What is claimed:

1. In a geometric instrument having (a) an instrument body with first and second ends, (b) first and second plumb vials adjacent to said first and second ends, respectively, (c) a level vial between said first and second plumb vials, (d) first and second wide sides, which oppose each other, and (e) first and second edge portions, which oppose each other, which bound said wide sides, and which are parallel to one another, an improvement comprising:

said first and second edge portions are each bounded by first and second channel portions, wherein said first channel portion of each of said first and second edge portions is parallel to said second channel portion of each of said first and second edge portions, respectively;

each of said first and second wide sides includes first and second flat surfaces which intersect each other to form first and second gripping channels, respectively;

each of said first and second gripping channels extends from said first and second channel portions, respectively, of said first edge portion to said first and second channel portions of said second edge portion and each of said first and second gripping channels extends between said first and second ends of said instrument body;

said instrument body is symmetrical about a plane of symmetry, which is perpendicular to said first and second edge portions and which is midway between said first and second wide sides;

each of said first and second flat surfaces of said first and second wide sides is angled with respect to said plane of symmetry and each of said first and second flat surfaces of said first wide side define an included angle of ranging from about 130° to about 170° therebetween.

2. The improved geometric instrument of claim 1, wherein said first and second gripping channels each extend toward said plane of symmetry and are spaced apart by a distance which is less than said width of either of said first and second edge portions.

3. The improved geometric instrument of claim 2, wherein a reinforcing member extends between said first and second wide sides.

4. The improved geometric instrument of claim 3, further comprising a vial assembly which contacts said reinforcing member.

5. The improved geometric instrument of claim 1, wherein:

said first wide side includes first and second spaced-apart openings;

said second wide side includes first and second spaced-apart openings laterally aligned with said first and second openings of said first wide side, respectively; and said first and second plumb vials are received in said first and second aligned openings of said first and second wide sides, respectively.

6. The improved geometric instrument of claim 5, further comprising an elongate aperture adjacent to said first end of said instrument body for receiving a hanger therethrough.

7. The improved geometric instrument of claim 1, wherein said instrument body is substantially hollow, each of said first and second edge portions has a width dimension which is less than a distance between said first and second edge portions, at least one of said first and second edge portions includes a ridge extending therealong, and said ridge projects toward another of said first and second edge portions.

8. The improved geometric instrument of claim 7, wherein said at least one ridge includes a plurality of ridges such that said plurality of ridges help to support any one of level vial assemblies and plumb vial assemblies and also help to prevent any one of said level vial assemblies and said plumb vial assemblies from rotating any one of clockwise and counterclockwise and any one of shifting laterally left and right.

9. The improved geometric instrument of claim 1, further comprising first and second ribs adjacent each of said first and second channel portions, respectively, for protecting said channel portions and said wide side from being scratched.

10. The improved geometric instrument of claim 1, further comprising rubber strips affixed to said first and second ends of exposed end surfaces of said instrument body in order to protect against possible scratching of other objects coming into contact with said instrument body and in order to seal off a substantially hollow interior of said instrument body.

11. The improved geometric instrument of claim 1, further comprising a magnetized strip along any one of said first and second edge portions in order to hold said geometric instrument in place when positioned on a metal surface.

12. In a geometric instrument having (a) an instrument body with first and second ends, (b) at least one vial mounted in said instrument body, (c) first and second wide sides, which oppose each other, and (d) first and second edge portions, which oppose each other, which bound said first and second wide sides, and which are parallel to one another, an improvement comprising:

each of said first and second edge portions has a width which is less than a distance between said first and second edge portions;

said instrument body has a hollow interior and has an interior reinforcing member within said hollow interior which extends between said first and second wide sides so as to be approximately parallel to said first and second edge portions, said interior reinforcing member being substantially planar;

each of said first and second wide sides includes first and second flat surfaces extending from one of said first and second edge portions, respectively, inwardly toward said reinforcing member;

said instrument body is symmetrical about a plane of symmetry, wherein said plane of symmetry is perpendicular to said first and second edge portions and is midway between said first and second wide sides;

each of said first and second flat surfaces is angled with respect to said plane of symmetry; and each of said first and second wide sides extends between said first and second ends of said instrument body.

13. The improved geometric instrument of claim 12, wherein said geometric instrument extends along a long axis and wherein said first edge portion includes two longitudinal ridges parallel to the said long axis and projecting from said first edge portion toward said reinforcing member.

14. The improved geometric instrument of claim 13, wherein each of said first and second wide sides forms a separate gripping channel having an interior apex and said body-reinforcing member extends between said apexes.

15. The improved geometric instrument of claim 12, wherein said included angle between said first and second flat surfaces of said first wide side is in a range of 130° to 170°.

16. The improved geometric instrument of claim 15, wherein said included angle between said first and second flat surfaces of said second wide side is in a range of 130° to 170°.

17. The improved geometric instrument of claim 16, wherein said included angle between said first and second flat surfaces of said first wide side and said included angle between said first and second flat surfaces of said second wide side are substantially equal to one another.

18. The improved geometric instrument of claim 12, further including rubber strips affixed to said first and second ends of exposed end surfaces of said instrument body in order to protect against possible scratching of other objects coming into contact with said instrument body and in order to seal off a substantially hollow interior of said instrument body.

19. The improved geometric instrument of claim 12, further comprising a magnetized strip along any one of said first and second edge portions in order to hold said geometric instrument in place when positioned on a metal surface.

20. The improved geometric instrument of claim 12, wherein said at least one vial mounted in said instrument body includes at least first and second plumb vials mounted adjacent to said first and second ends of said instrument body, and at least one level vial mounted between said at least first and second plumb vials.

* * * * *